(12) United States Patent
Duan

(10) Patent No.: US 8,386,235 B2
(45) Date of Patent: Feb. 26, 2013

(54) COLLABORATIVE TRANSLATION SYSTEM AND METHOD

(75) Inventor: Xiaojiang Duan, Chaoyang District Beijing (CN)

(73) Assignee: Acosys Limited, Hong Kong (HK)

( * ) Notice: Subject to any disclaimer, the term of this patent is extended or adjusted under 35 U.S.C. 154(b) by 371 days.

(21) Appl. No.: 12/783,568

(22) Filed: May 20, 2010

(65) Prior Publication Data

US 2011/0288851 A1 Nov. 24, 2011

(51) Int. Cl.
*G06F 17/28* (2006.01)

(52) U.S. Cl. .................. 704/5; 704/3; 704/7; 704/2

(58) Field of Classification Search .............. 704/2–8
See application file for complete search history.

(56) References Cited

U.S. PATENT DOCUMENTS

| | | | |
|---|---|---|---|
| 5,884,246 A * | 3/1999 | Boucher et al. | 704/2 |
| 6,161,082 A * | 12/2000 | Goldberg et al. | 704/3 |
| 6,338,033 B1 * | 1/2002 | Bourbonnais et al. | 704/3 |
| 6,347,316 B1 * | 2/2002 | Redpath | 1/1 |
| 6,526,426 B1 * | 2/2003 | Lakritz | 715/264 |
| 7,110,938 B1 | 9/2006 | Cheng et al. | |
| 7,536,294 B1 * | 5/2009 | Stanz et al. | 704/3 |
| 2005/0010419 A1 | 1/2005 | Pourhamid | |
| 2006/0206797 A1 * | 9/2006 | Kohlmeier et al. | 715/500.1 |
| 2007/0067154 A1 | 3/2007 | Ryan, III | |
| 2007/0294076 A1 | 12/2007 | Shore et al. | |
| 2009/0204385 A1 | 8/2009 | Cheng et al. | |

* cited by examiner

*Primary Examiner* — Jesse Pullias
(74) *Attorney, Agent, or Firm* — Fidel Nwamu; Nwamu, PC (57) ABSTRACT

A system and method for translating source data from a source language to a target language. The source data is uploaded by a user and received by the translation system after proper user authentication. The source data is fragmented into source segments that can be separately translated. Revision control is provided by locking each source segment so that each source segment is not subject to multiple translations at any given time. A segment status is applicable to each one of the segments. Upon completion of translation, each source segment is recombined into a single target data.

6 Claims, 13 Drawing Sheets

Translia
CLOUD TRANSLATION

Welcome back.  Account
Logout

CLIENT

My home
Quotes
Translation
Support

My Home — 340
● My credits: 0
— 342
▦ Budget calculator

— 300

— 344    — 346
Request quote   Buy credits

Terms  Privacy  About  Contact  Guide

© 2010 Acosys

Translia
CLOUD TRANSLATION

Welcome back.   Account
                Logout

CLIENT

My home
Quotes
Translation
Support

Create Quote Request

572 — Title:* WEBSITE TRANSLATION PART 8 - IT

Basic

574 — Source language:*

576 — Target language:*
Available Options:
- Abkhaz
- Afrikaans
- Albanian
- Amharic
- Arabic (Standard)
- Armenian
- Assamese
- Aymara
- Azerbaijani (Latin)
- Azerbaijani (Perso-Arabic)

Selected Options:

578 — Time limit:*
3 days
Time you plan to leave to translators for this job.

580 — Quality:*
○ Excellent   ● Good   ○ Gist
Learn more about the quality options.

582 — Instructions:*

The more translators know about your job, the better translations they can deliver. To the least, describe your target audience, and explain how and where the translation will be used. HTML tags are allowed.

Source:*
● Text   ○ Files

584 — Source text:

Documentation is minimal at this point. A proper guide (English) is in progress, with a substantial portion of basic information complete. It is still too rough to distribute, but will become available as the application moves towards a full versioin 1.0 release.

Type or paste the text to translate.

586 — Search

*FIG. 5*

|||| || ||| || |||
|TRANSLIA.COM

←— 600

Translation  Forum  Group  Quiz  Support

[Search]

Welcome  
Account | Logout  
Endorsers ⎯ 699

Home ⎯ 686

Search this site: ⎯ 685

| View | My results | Translation | Locked Documents | Kudos |

687 {
Miranda R5  
nicole oberholzer R9  
JoaoFPG R10  
bonabadial R8  
Hungarian native R9  
ladyblue R10  
BlueValentine R7  
dgimirizaldo R9  
poangiosse R9  
pistache R9  
agruendel R5  
xncabu R7  
}

Translator Rank: ⎯ 688  
$

Translator Page View: ⎯ 689  
2547

Relationships  
Report actions  
  Become iscro090s Endorser

Report:  
Report abuse

Affiliate  
Manage your business here.

Translator profile ⎯ 690

Translator  
My home  
My translation  
My earning  
My groups  
My relationships  
Invite friends  
Link to us  
Affiliate 691 ⎯ First language  
Italian 692 ⎯ Second language  
English 693 ⎯ Additional languages  
French  
About ⎯ 694  
I'm 45 y.o. and worked 20 years in public administration ((Government)) as Secretary and Linguist. Professional language experience in Defense related matters (18 years) and linguistic training.

695 ⎯ Education  
University degrees in Modern Foreign Languages & Literature (English and French)

696 ⎯ Qualifications  
Doctor  
Interest  
Literature, travel, gardening, music, internet 697 ⎯ History  
Member for  
13 weeks 2 days  
Affiliates  
Affiliate points  
leurs09 has earned 0 points Terms  Privacy  Community guideline  Forums  Group  Poli  Contact  Guide © 2010 Acosys

TRANSLIA.COM

↙ 800

Translation   Forum   Group   Quiz   Support

Welcome
Account | Logout

Translator

My home
My translation
My earning
My groups
My relationships
Invite friends
Link to us
Affiliate Search this site:            [ Search ]

Home >> Job 143351 >> Translation

Segment  ┌849  ┌851  ┌853
855 ─┤ View │ Edit │ Revisions │ Contribution │

Source text:
839 ─▲ Documentation is minimal at this point. A proper guide (English) is in progress, with a substantial portion of basic information complete. It is still too rough to distribute, but will become available as the application moves towards a full version 1.0 release.

Target text:
841 ─▲ La documentazione e minima a questo punto. Una guida adeguata ( in Inglese) e in lavorazione, con una sostanziale parte di informazioni di base completa. E' ancora troppo approssimativa per distribuirla, ma sara disponibile non appena l'applicazione di avvicina verso il rilascio 1.0.

843 ─ Status: Ready to commit
845 ─▲ Basic
    Source language: English
    Target language: Italian Add new comment      Subscribe to: This post 857 ─┤ restyling
    Submitted by rkohn R5 on Tue, 2010-04-20 14:59.
I would say as follows, in a better Italian:
"In questo momento la documentazione e minima. Una guida corretta (in inglese) e in fase di preparazione e la parte essenziale di informazioni di base e completa. Pur essendo al momento ancora imperfetta per essere distribuita, sara disponibile non appena l'applicazione passera alla versione 1.0 completa."

reply    Report

|||| |||| ||||
||TRANSLIA.COM

Welcome
Account | Logout

Translator

My home
My translation
My earning
My groups
My relationships
Invite friends
Link to us
Affiliate Translation  Forum  Group  Quiz  Support Search this site: [ Search ]

Home >> My account
My account

| View | Affiliate Center | Edit | Invitations | My results | Notifications | Translation | Locked documents | Kudos |

| Title ▲ | Locked since | Persistent lock | Operations |

1057

1. Website Translation    4/15/2010 ← 1059

2. Manual Translation    4/1/2010

Terms  Privacy  Community guideline  Forums  Group  Poli  Contact  Guide

© 2010 Acosys

TRANSLIA.COM

↙—1100

Translation  Forum  Group  Quiz  Support

Welcome  
Account | Logout

[ Search ]  
Search this site:

Translator118 Endorsers  Home

Miranda R5  
nicole oberholzer R9  
JoaoFPG R10  
bonabadial R8  
Hungarian native R9  
ladyblue R10  
BlueValentine R7  
dgimirizaldo R9  
poangiosse R9  
pistache R9  
agruendel R5  
xncabu R7

Translator

My home  
My translation  
My earning  
My groups  
My relationships  
Invite friends  
Link to us  
Affiliate

Kudos awarded to Translator 118

| View | My results | Translation | Locked documents | Kudos |

Current kudos: 170 —— 1061

| Points | Date | Description |
|---|---|---|
| 10 | 2010-02-16 19:00 | Posted comment 8781 on forum 145206 |
| 10 | 2010-02-11 09:57 | Posted comment 8523 on forum 141465 |
| 10 | 2010-02-04 18:18 | Posted comment 8302 on forum 142980 |
| 10 | 2010-02-02 20:25 | Posted comment 8215 on forum 138414 |
| 10 | 2010-01-28 09:07 | Posted comment 7928 on forum 136414 |
| 10 | 2010-01-27 11:42 | Posted comment 7882 on decisions_selection 119558 |
| 10 | 2010-01-25 18:51 | Posted comment 7805 on topic 132483 |
| 10 | 2010-01-22 09:11 | Posted comment 7621 on project_issue 130661 |
| 10 | 2010-01-22 08:55 | Posted comment 7618 on topic 1121028 |
| 10 | 2010-01-11 18:48 | Posted comment 7099 on topic 117746 |
| 10 | 2010-01-01 19:36 | Posted comment 7074 on topic 115176 |
| 10 | 2010-01-08 19:12 | Posted comment 7072 on topic 117746 |
| 10 | 2010-01-07 17:39 | Posted comment 7032 on segment 123856 |
| 10 | 2010-01-06 14:34 | Posted comment 6984 on topic 125506 |
| 10 | 2009-12-17 10:06 | Posted comment 5993 on segment 119662 |
| 10 | 2009-12-17 07:38 | Posted comment 5989 on job 119572 |
| 10 | 2009-12-15 21:16 | Posted peoject_issue 119571 |

*FIG. 11*

TRANSLIA.COM

← 1200

Translation  Forum  Group  Quiz  Support

Welcome
Account | Logout

Search this site: [                    ] [Search]

Home >> Translator 118

Translator118 Endorsers

Miranda R5
nicole oberholzer R9
JoaoFPG R10
bonabadial R8
Hungarian native R9
ladyblue R10
BlueValentine R7
dgimirizaldo R9
poangiosse R9
pistache R9
agruendel R5
xncabu R7

Translator

My home
My translation
My earning
My groups
My relationships
Invite friends
Link to us
Affiliate

[View] [My results] [Translation] [Locked documents] [Kudos]

Jobs the user worked on. Only the active public jobs are listed.

| ID▼ | Title | Source | Target | Words | Contribution | Edits |
|---|---|---|---|---|---|---|
| 143351 | Webpage Translation Part 8-IT | English | Italian | 202 | 36.76% | 689 |
| 139051 | Manuale CiviCRM-Piattaforma open-source gratuita per il non-profit | English | Italian | 72086 | 2.25% | 526 |
| 132645 | Webpage Translation (Client 2)-IT | English | Italian | 101 | 43.76% | 364 |
| 131181 | Webpage Translation (Client)-IT | English | Italian | 2038 | 25.39% | 2534 |
| 126802 | Webpage Translation Part 7 - IT | English | Italian | 1307 | 21.93% | 1369 |
| 123828 | Webpage Translation Part 6 - IT | English | Italian | 614 | 36.01% | 1933 |
| 121454 | Webpage Translation Part 5 - IT | English | Italian | 1188 | 9.34% | 2424 |
| 119572 | Webpage Translation Part 3C - IT | English | Italian | 1100 | 15.16% | 3672 |
| 105141 | Omegatplus_doc_first_three_italian | English | Italian | 10010 | 9.88% | 1528 |

COLLABORATIVE TRANSLATION SYSTEM AND METHOD

BACKGROUND OF THE INVENTION

The present invention relates generally to computer information and network translation systems and methods and more specifically to computer information and network translation systems and methods for performing collaborative translation of source data from a source language to a target language.

Our world is becoming progressively more global with increasing interaction between entities and individuals around the world. Such interaction might relate to E-commerce or international business context or might simply be interactions with governmental entities, all of which constantly require document translation between different languages.

Traditional document translation is typically performed by a translation agency, which uses freelance translators and/or other staff. Before a translation job is initiated, the work terms and conditions are negotiated between the user and the translation agency/freelance translators. Such terms and conditions might include pricing, availability, deliverables and other like conditions.

It is only then that the translation work can proceed. The translation work itself often occurs sequentially. First, the source document is translated into the target language. This source document translation is often performed by a single translator. After translation, the next process is proofreading. And following proofreading, other requisite processes that might be needed are then performed as well.

The aforementioned sequential process can cause or lead to significant time delays for deliverables. Moreover, since language translation is performed by a single translator, it can be difficult for any single translator to handle a large translation project. Even relatively small translation projects can be declined by traditional translation agencies because the negotiation costs often exceed the translation costs.

After a completed translation project is delivered, the client is typically unable to review the project for quality as many such clients are unfamiliar with the target language. At that point the client can only accept the translation in good faith hoping that the translation was performed substantively and in a correct manner. Even when clients understand target languages, they typically do not have the opportunity to preview the translation before final delivery; and may later discover problems after the final translation is delivered.

While some existing online translation systems may have resolved some of the aforementioned issues related to traditional translation systems, many disadvantages continue to exist. It is within this context that a need for the present invention has arisen. There is a need to address one or more of the foregoing disadvantages of conventional systems and methods, and the present invention meets this need.

BRIEF SUMMARY OF THE INVENTION

Various aspects of a collaborative translation system and method can be found in exemplary embodiments of the present invention.

In a first embodiment, a method for translating source data from a source language to a target language is disclosed. The source language, for example, might be English while the target language might be Italian. The source data might comprise a text document such as an existing HTML web page for translation into a target language. Here, the source document is sent by a user to a host translation system for translation in accordance with the present invention.

In a first embodiment, the method is initiated after the host translation system receives the source data for translation. Following receipt, the source document is itself fragmented into two or more separate portions or segments. Each source segment is independently translatable from source language to target language as separate units. Unlike traditional agencies in which a single translator is used for each source document, the present invention is efficient and considerably reduces delay since multiple translators can contemporaneously work on each separate source segment. The entirety of the source data can be contemporaneously unlike sequential traditional systems.

The method of the present invention further provides revision control by locking each source segment so that each source segment is not subject to multiple translations at any given time; as well as assigning a status state to each source segment. Thereafter, each translated source segment is recombined into a single target document. A contribution amount indicating a measure of translation performed is also determined This contribution amount is based on a total number of character changes in a source segment as well as a status state of each source segment. In this manner, translation collaboration is facilitated to assure translation quality and translated source segments can be improved from one status state to another unlike traditional translation agencies.

Another embodiment of the present invention discloses a collaborative translation system having a computer processor and associated memory capable of processing computer code, the system having computer code for receiving the source document for translation after the transmitting user is authenticated; computer code for fragmenting the source document into several source segments that are independently translatable from source language to target language as separate units; computer code for providing revision control by locking each source segment so that each source segment is not subject to multiple translations at any given time; and upon completion of translation, computer code for recombining each of the source segments into a single target document.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as to not unnecessarily obscure aspects of the present invention.

Figure 1:
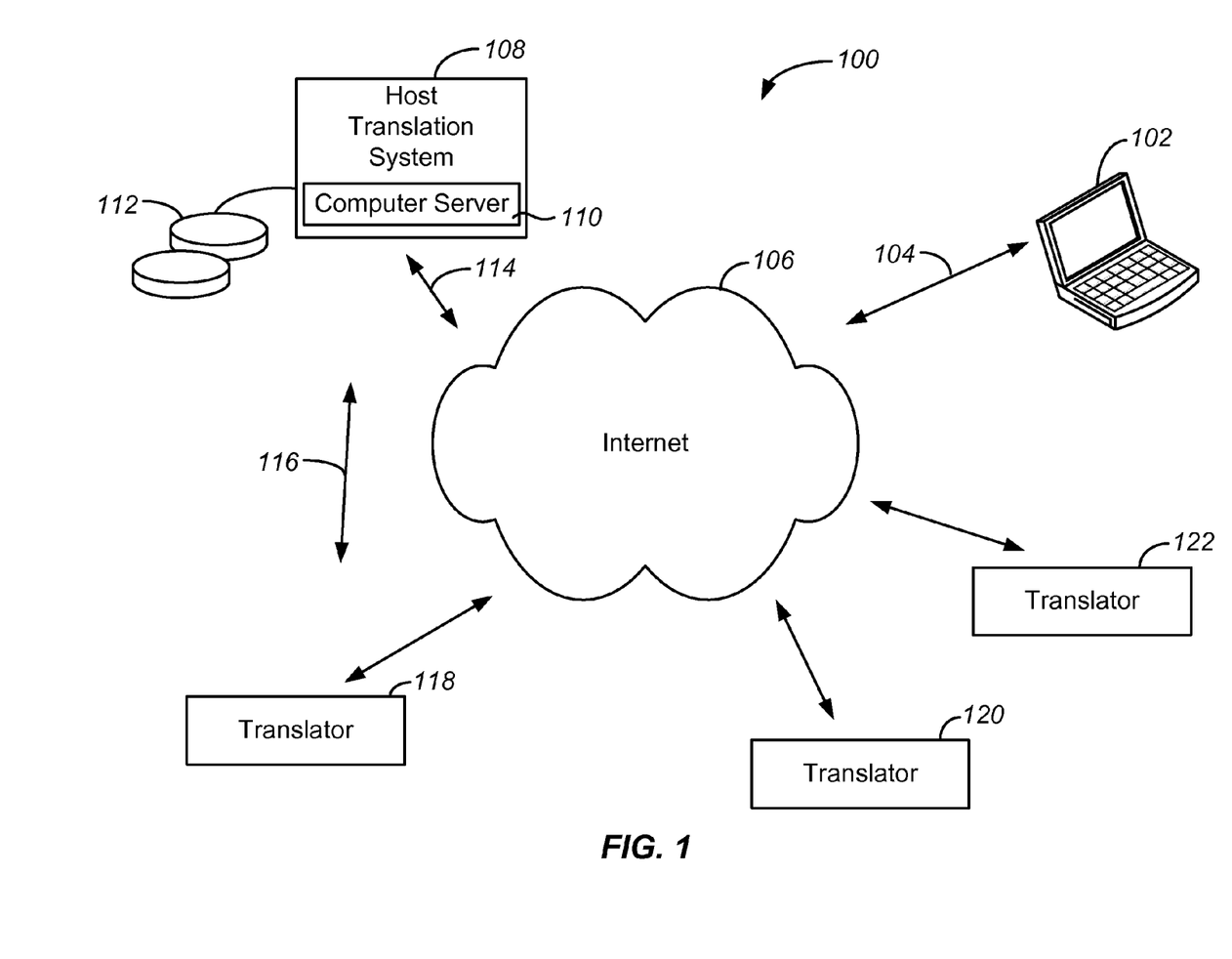
FIG. 1 illustrates a computer network translation system according to an exemplary embodiment of the present invention.

FIG. 1 illustrates computer network translation system 100 according to an exemplary embodiment of the present invention.

In FIG. 1, computer network translation system 100 enables user 102 to provide source data in a source language for translation into a target language different from the source language. Note that as used herein, the term "source data" might refer to "source text", "source documents" or other data type and thus all such terms are used interchangeably.

Among other components, computer network translation system 100 comprises user 102 communicably coupled to host translation system 108 via Internet 106.

Although not shown, Internet 106 represents any distributed network (wired, wireless, or otherwise) for data transmission and receipt between/among two or more points.

Here, user 102 (exemplarily illustrated as a computer) can be any computing platform executing software instructions via a processor and memory and having a user interface comprising at least one user input and one user output. User 102 might use an Internet browser for communicating with host translation system 108. Source documents for translation into a target language can be uploaded by user 102.

A plurality of translators 118, 120 and 122 are also communicably coupled to host translation system 108 via Internet 106. Translators 118, 120, 122 can also be any computing device capable of accessing host translation system 108. Translators 118, 110, 122 are operable by human translators are capable of accessing source documents served up by host translation system 108. Host translation system 108 might be a server computing device supporting a translation portal and incorporating a plurality of databases 112.

As shown, translator 118 is coupled to a host translation system 108 via Internet 106. In addition, host translation system 108 and translator 118 can also be directly coupled via communication link 116.

Briefly, in operation translators 118, 120, and 122 begin by registering with host translation system 108. Translator 118, for example, can translate from a primary language such as English to a target language such as Italian. Translator 120 might be able to translate between Japanese and English documents for example. Translator 122 might have the capabilities of translating between a source language such as Swahili to a target language such as Farsi. Although not shown, more or fewer translators capable of translating between a different plurality of world languages, including multi-ethnic and formal and informal contexts, can be utilized, all of which might be communicably coupled to host translation system 108.

User 102 also begins by registering with host translation system 108. User 102 and translators 118, 120, and 122 can be located in different regions of the world. User 102 accesses host translation system 108 via a website served up by host system 108. User 102 creates and stores in database 112 a user profile having relevant user information such as name, contact information, address, email, etc. After registration, necessary user authentication information such as a user ID and password are assigned for use to access host translation system 108. User 102 is now ready to perform any desired source language to target language translations.

User 102 uploads a source document to host translation system 108 for translation (or proof reading or editing). The source document is segmented into a plurality of segments such that multiple segments can be contemporaneously translated by different translators. Three different segments, for example, might be translatable by each of translators 118, 120 and 122. Segments are locked for revision control, classified into different status categories and amounts of edits and contribution amounts are automatically calculated.

Upon completion of translation, translated target segments are recombined into a single target document that is then made available to user 102. Note that completion of translation is not the first time user 102 has access to the target document. Prior to completion, host translation system 108 regularly builds the target files and user 102 can view the translation in-progress, at any time. In this manner, the present invention enables users to preview the work before it is completed. Such preview is desirable when the user is familiar with the target language and can check for errors.

Thus, the source document, as translated in accordance with exemplary embodiments of the present invention, includes contemporaneous translation, is efficient, time-saving and also allows for collaborative translations as will be further described below with reference to exemplary embodiments of the present invention.

Figure 2:
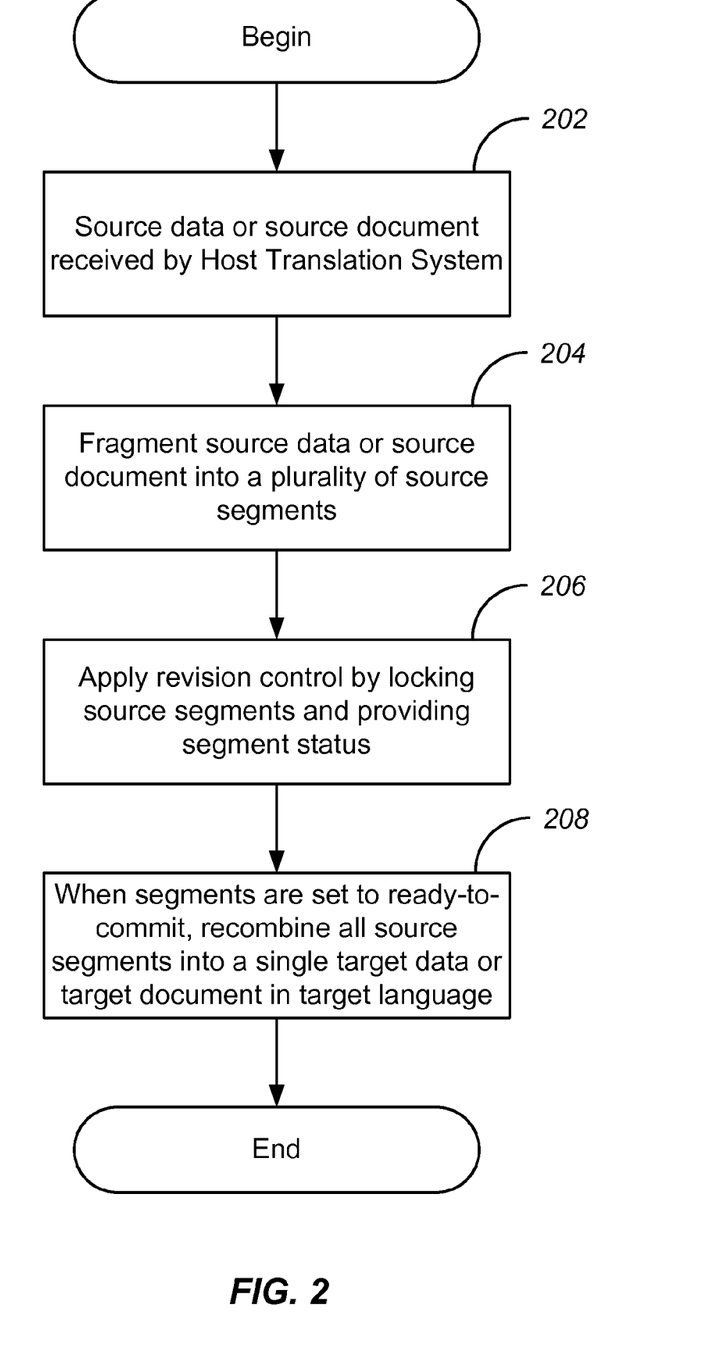
FIG. 2 illustrates a method for translating a source document from a source language (English) to a target language (Italian) according to an exemplary embodiment of the present invention.

FIG. 2 illustrates method 200 for translating source document 839 (FIG. 8) from a source language (English) to a target language (Italian) according to an exemplary embodiment of the present invention.

Specifically, source document 839 is an English language software document for translation to Italian. Source document 839 might contain text or any data type pertaining to a specific language for translation into another language. As another example, source document 839 can be a French HTML page to be translated into a Chinese HTML page.

At step 202, method 200 involves receiving source document 839 at host translation system 108. Source document 839 is uploaded by user 102 after the user is properly authenticated. Since user 102 has previously completed a registration process that allows for storage of the user's profile, user 102 can access host translation system 108 for translations.

At step 204, source document 839 is fragmented by host translation system 108 into a plurality of source segments. Unlike traditional agencies in which a single translator is used for each source document, the present invention is efficient since multiple translators can contemporaneously work on each separate source segment of source document 839. For example, translator 118 might work on translating a first source segment while the second and third source segments are respectively translated by translators 120 and 122.

The segmentation method applied by host system 108 depends upon the source document file type. If the source document is a text file or similar type files, it is segmented into the shortest translatable pieces. It might be segmented into sentences, paragraphs, table title or cell text, for example.

If a source document (e.g. PO, POT, XLIFF) is already segmented, the native segmentation is followed; that is, a segment note is generated for each segment defined in the source files. A segment might be the linguistic meaning of a sentence, typically a text string ending with a period, question mark (?), or quotation mark ("). Here, source document 839 is a text file and is simply segmented according to paragraphs into a plurality of source segments.

At step 206, revision control is applied to each source segment. Revision control is another advantage of the present invention. Revision control is achieved by locking the source segment so that said source segment can only be worked on by a single translator at any given time. Without revision control, each source segment is subject to multiple translations at any given time. In one embodiment, each source segment is configured to be locked for a predetermined time duration. In an alternate embodiment, source segments remain locked only while the translator working on said source segment remains logged in. In a further embodiment, source segments might become unlocked during periods of long inactivity.

Note that while each translator works with a segment, the translator can view the source and target for other segments in a real time. This feature ensures translation consistency and fluency.

Another advantage of the present invention is that additional revision control can be applied by assigning one of a plurality of segment statuses to each source segment. A segment status or state indicates the current phase of the source segment and the type of work needed to transition the source segment to the next phase. The segment statuses are: (1) translation needed; (2) editing needed; (3) proof-reading needed; and (4) ready-to-commit.

Translation needed is the default when a source segment is yet to be translated. Editing needed refers to a source segment that has been translated but needs improvement. Proof-reading needed, as implied by its name, is a source segment that requires proof reading. Ready-to-commit is a source segment that has been translated, edited, proof read, and is ready for client use.

Upon completion of one phase, the translator that completes a particular phase can set the source segment to the next state. For example, if translator 118 has completely translated the first source segment into Italian, translator 118 can set the first source segment status to editing needed.

However, translator 118 cannot set the first source segment status to proof-reading needed or ready-to-commit. Setting of a segment status beyond the next immediate status requires a different translator. That is, the same translator cannot work on a source segment for two sequential phases. In this manner, the present invention ensures that a different translator works on the source segment to improve the work of the prior translator.

Another aspect of the present invention relates to who can edit a ready-to-commit source segment. When a source segment is designated as ready-to-commit, only the following translators may edit the source segment: (1) the last translator who worked on the source segment, typically the translator that performed the proof-reading; (2) translators with a higher translator rank than the last editor; and (3) translators with a predetermined high rank.

Note that the translator ranking system, which measures the translation experience and performance of translators based on client ratings, peer review (translator endorsement) and other portal activities is another novel aspect of the present invention. In this manner, translators with higher rankings can improve the finished translation products while lower level translators that have not established credibility and whose work product might be questionable cannot edit finished work products.

Contribution Measurement

Host translation system 108 is configured to measure contribution amounts by each translator based on (1) the number of edits; and (2) the status of the source segment. Preferably, the number of edits is determined by an addition or deletion of character. For example, if two five-letter words are deleted, the number of edits is 10.

As noted earlier, the status of the segment source can be (1) translation needed; (2) editing needed; (3) proof-reading needed; and (4) ready-to-commit. Different weights are assigned to the different segment statuses. For example, translation needed might be assigned a "6" weight while editing needed might be a "3". Translators are therefore compensated based on their contribution percentage determined by host translation system 108.

By combining segmentation, revision control and contribution management, the present invention allows multiple translators to collaborate because translators are incentivized to not only contribute as much as possible but also to improve the quality of their translations. Translators refrain from providing questionable or meaningless contributions when source segments are edited. In this manner, the present invention achieves collaborative and concurrent translation that improves translation time and quality and reduces cost.

At step 208, when all segment statuses are set to ready-to-commit and the job progress is 100%, all of the separate source segments are recombined into a single target language file in Italian for use by user 102.

Figure 2A:
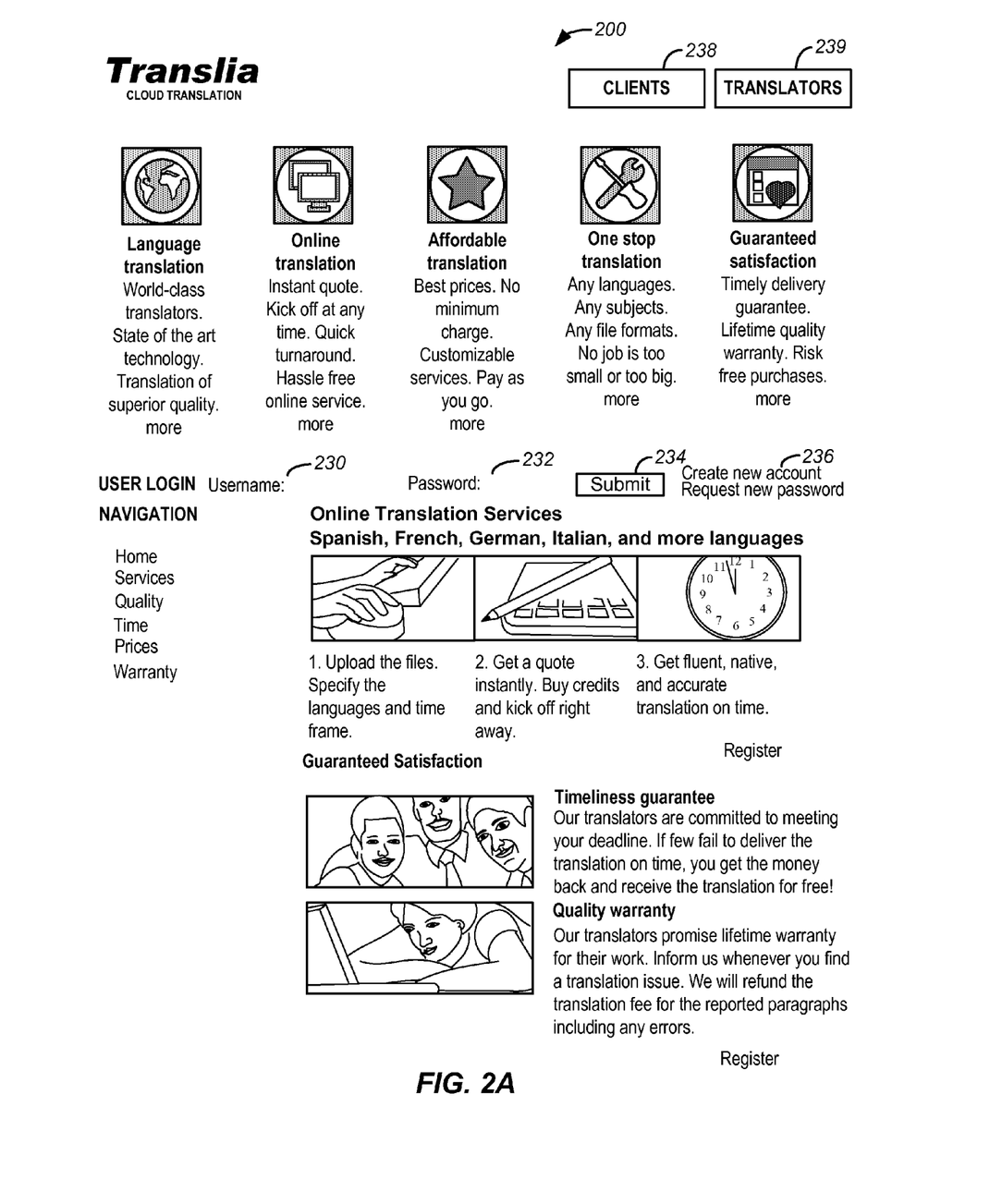
FIG. 2A illustrates a user-portal screen shot according to an exemplary embodiment of the present invention.

FIG. 2A illustrates user-portal screen shot 200 according to an exemplary embodiment of the present invention.

User-portal screen shot 200 essentially enables user 102 to access host translation system 108. Here, user portal screen shot 200 comprises "CLIENTS" link 238, "Username" field 230, "Password" field 232, and "Log in" button 234. User 102 begins by selecting "CLIENTS" link 238 to indicate that the user wishes to access the client portal and not the translator portal (accessed via "TRANSLATORS" link 239).

Figure 3:
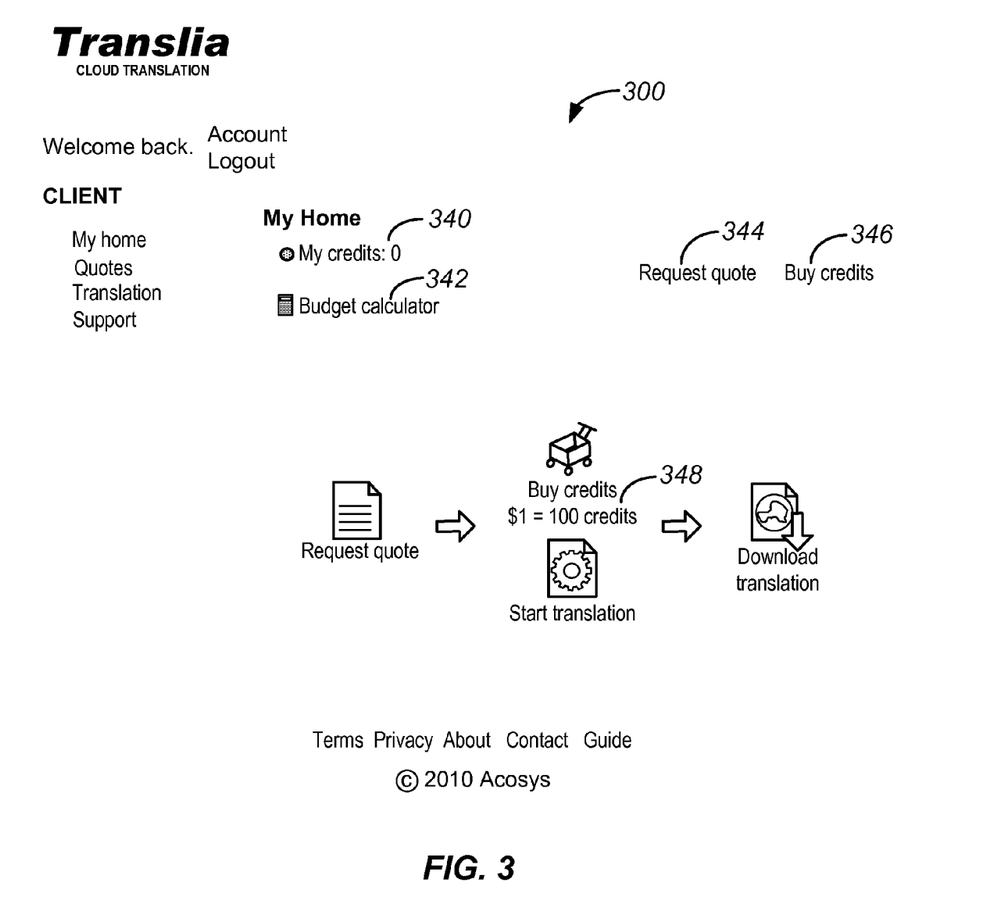
FIG. 3 illustrates a user-home screen shot according to an exemplary embodiment of the present invention.

User 102 next provides the requisite authentication information for "Username" field 230 and "Password" field 232 after which the "Log in" button 234 is selected, whereupon 234, user 102 is granted access to host translation system 108. If user 102 has already established an account, the user simply enters the appropriate name and password in "Username"

field 230 and "Password" field 232. Once access to host translation system 108 is granted to user 102, home screen shot 300 is served up.

FIG. 3 illustrates user-home screen shot 300 according to an exemplary embodiment of the present invention.

User-home screen shot 300 comprises "My credits" display 340, "Budget calculator" link 342, "Request quote" link 344 and "Buy credits" link 346. User 102 can use "Buy credits" link 346 to purchase credits used to pay for document translations. Here, the unit for transactions is based on credits.

In one exemplary embodiment, the equivalent of one dollar is 100 credits. The user might purchase a basic package of 100 credits or might purchase up to 104,000 credits for a platinum package. Once a credit purchase is made, the total number of credits purchased is reflected by "My credits" display 340. Here, user 102 might also click on "Budget calculator" link 342 for translation estimates as further discussed with reference to FIGS. 4A and 4B, below.

Figure 4A:
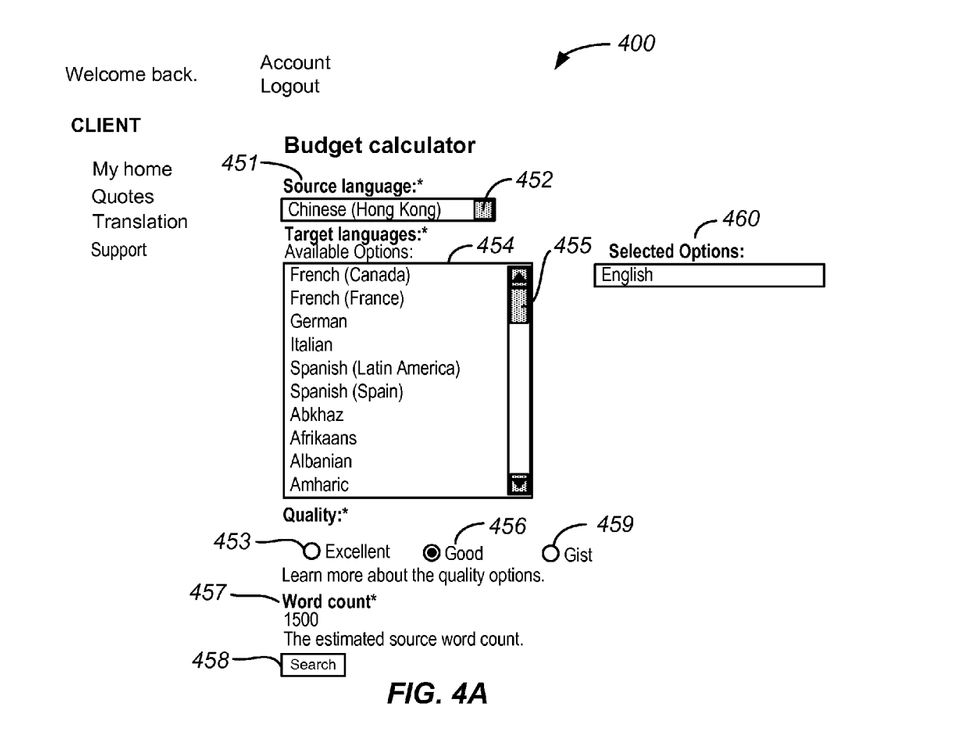
FIG. 4A shows a "Budget calculator" screen shot according to an exemplary embodiment of the present invention.

FIG. 4A shows "Budget calculator" screen shot 400 according to an exemplary embodiment of the present invention.

In FIG. 4A, user 102 can use "Budget calculator" screen shot 400 to estimate the credit amount required for a particular transaction. Here, user 102 is desirous of translating a Chinese document into an English document. User 102 wishes to determine the cost of such a translation.

As shown, user 102 uses drop-down button 452 to select a source language from "Source language" menu 451. Here, Chinese (Hong Kong) has been selected as the source language. User 102 next uses scroll bar 455 to select a target language from "Target language" menu 454. Next, radio button 456 is used to select the desired translation quality.

An advantage of the present invention is that multiple levels of translation quality are offered. If the selected level of quality is "Gist" 459, a basic translation process is performed. If the selected level of quality is "Good" 456 (as selected here), a more qualitative two-step translation process is performed. In the first step, language translation is performed by a translator. Following language translation, an edit step is then carried out by another translator. In this manner, another translator can improve the quality of the translation as proves necessary.

If the selected level of quality is "Excellent" 453, a three-step qualitative translation process is performed. This includes translation, editing and proof-reading, each step being undertaken by a different translator. The editor can improve on the translation, and the proof-reader can improve on the editing. In this manner, an excellent translation quality is achieved. Thus, user 102 can select at least three different quality levels based on user preference.

"Budget calculator" screen shot 400 also includes "Word count" field 457 and "Save" button 458. The word count is the total number of words in the source document. As shown, the word count here is 1,500. Finally, user 102 can select save button 458 to save and provide a budget estimate as illustrated in FIG. 4B below.

Figure 4B:
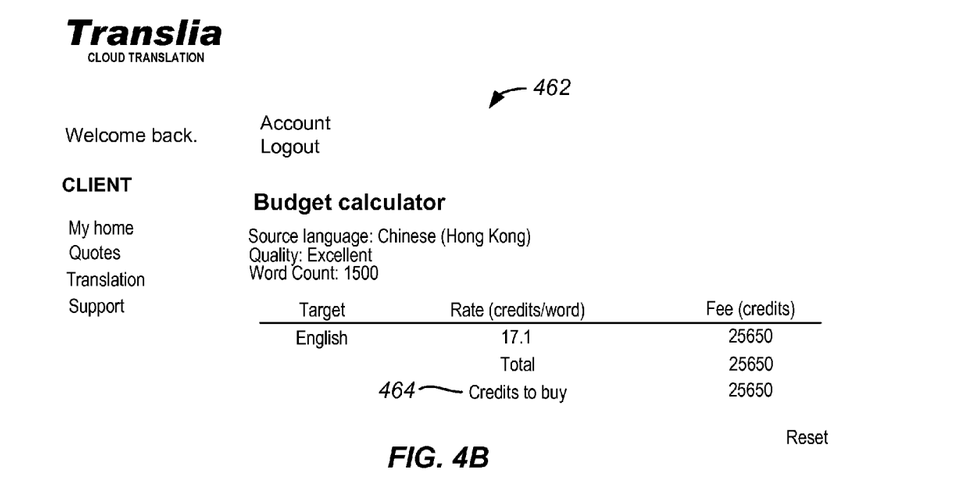
FIG. 4B illustrates the estimated credit amount needed for the document translation of FIG. 4A.

FIG. 4B illustrates the estimated credit amount needed for the document translation of FIG. 4A. As can be seen, the total "Credits to buy" 464 is 25650 credits.

Figure 5:
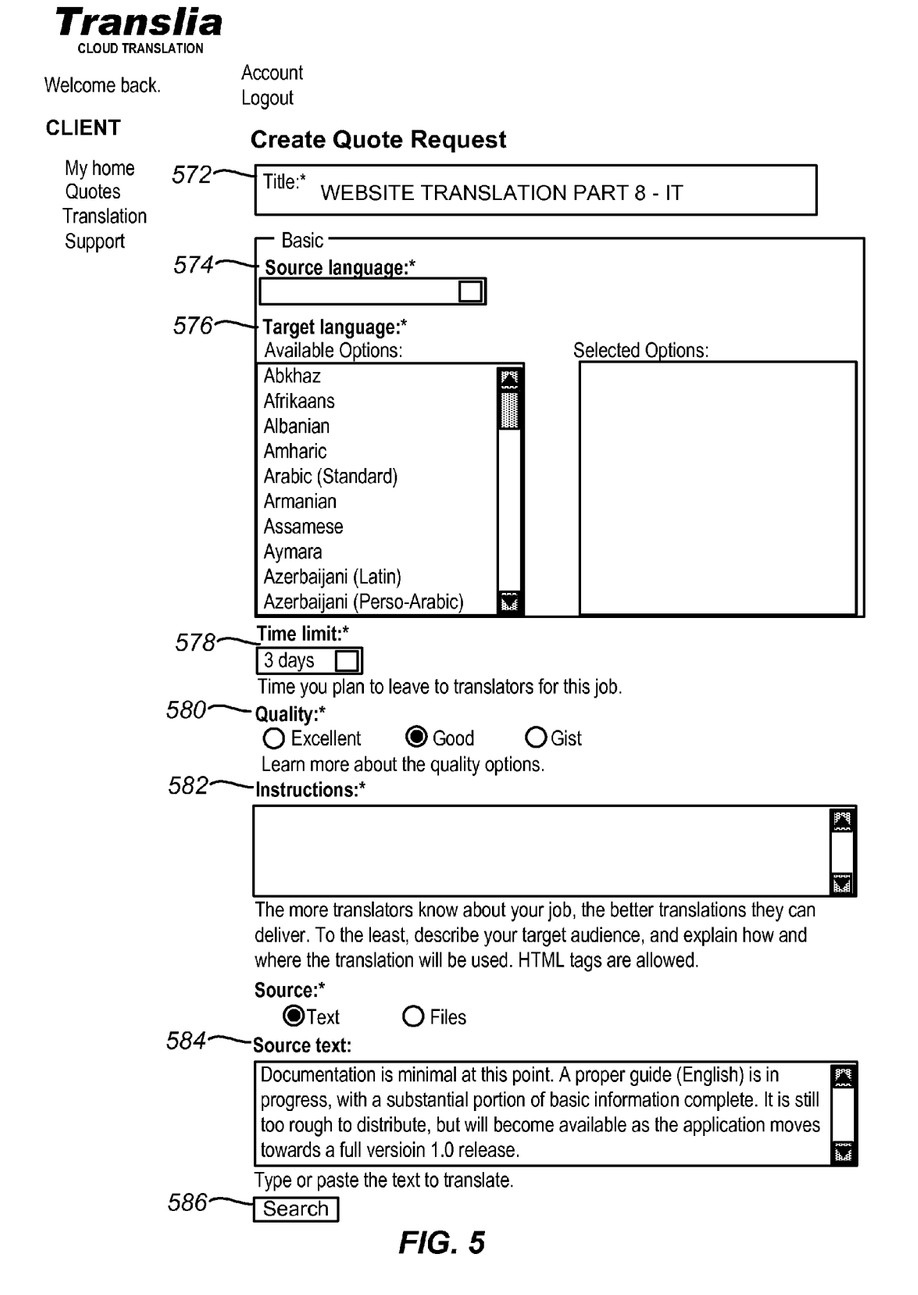
FIG. 5 is a "Create Quote Request" form according to an exemplary embodiment of the present invention.

FIG. 5 is a "Create Quote Request" form 570 according to an exemplary embodiment of the present invention.

In FIG. 5, user 102 can use "Create Quote Request" form 570 to request a quotation for a translation job. "Create Quote Request" form 570 can be accessed by selecting "Request quote" link 344 of FIG. 3.

"Create Quote Request" form 570 comprises "Title" field 572, "Source language" select menu 574 and "Target language" select menu 576. As shown, user 102 has entered as title "Website Translation Part 8—IT." User 102 has also selected a source language as English while Italian has been selected as the target language.

"Create Quote Request" form 570 also comprises "Time limit" select menu 578 for indicating the amount of time available for performing the work, "Quality" select radio buttons 580 to select the desired work quality, "Instructions" receive area 582 to provide additional information, "Source text" receive area 584 for receiving source text for translation and "Save" button 586. Here, user 102 has indicated a three-day time limit as well as good quality. No special instructions are provided while the English source text (for translation to Italian) in "Source text" receive area 584 is as follows:

> Documentation is minimal at this point. A proper guide (English) is in progress, with a substantial portion of basic information complete. It is still too rough to distribute, but will become available as the application moves towards a full version 1.0 release.

Although the above source text has been provided, one of ordinary skill in the art will understand that this is exemplary and any type source data consistent with the present invention can be utilized. Upon clicking "Save" button 586, the quote request is submitted to host translation system 108.

Once the quote request is received, it is evaluated and then returned with a price quote to user 102. Specifically, upon receiving "Create Quote Request" form 570, host translation system 108 analyzes the source text and provides a rate, word count, fee, and verifies that the time frame proposed by user 102 is reasonable. This function ensures that users receive instant and accurate quotes unlike traditional agencies wherein quotes are provided only after the source text is evaluated by human translators. At this point, user 102 can then authorize translation of the source text.

Embodiments of the present invention will now be described with reference to the translator portal user interface of the present invention. Referring to FIG. 2, translators 118, 120 and 122 (FIG. 1) can also register with host system 108 by clicking on "TRANSLATORS" link 239 of FIG. 2A, whereupon translator-home screen shot 600 of FIG. 6 is displayed.

Figure 6:
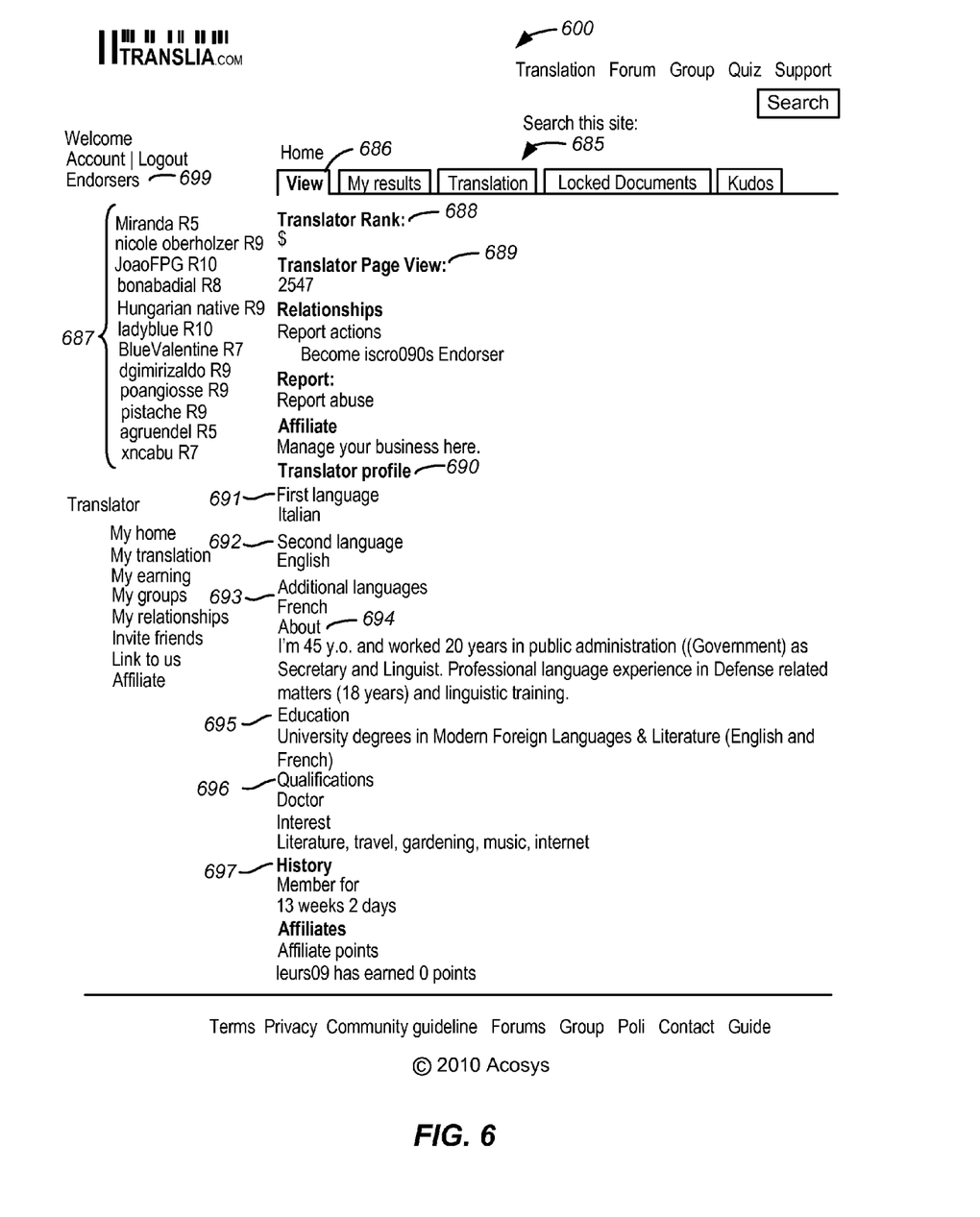
FIG. 6 illustrates translator-home screen shot for a translator in accordance with an exemplary embodiment of the present invention.

FIG. 6 illustrates translator-home screen shot 600 for translator 118 in accordance with an exemplary embodiment of the present invention.

In FIG. 6, translator-home screen shot comprises tabs 685 that can display various information specific to translator 118. Tabs 685 include "View" tab 686, a "My results" tab, a "Translation" tab, a "Locked documents" tab and a "Kudos" tab. Selection of "View" tab 686 shows that the "Translator Rank" 688 of translator 118 is 8, and the "Translator Page View" 689 is 2547. The "Translator Profile" 690 of translator 118 shows that the translator's "First Language" 691 is Italian, the "Second Language" 692 is English, and "Additional Languages" 693 is French.

"Translator profile" 690 also shows that the "Education" 695 of translator 118 is a university degree in Modern Foreign Languages and Literatures; the "Qualifications" 696 of translator 118 is a doctor; the "History" 697 indicates that translator 118 has been a member for 18 weeks and two days; the "About" 694 indicates that translator 118 is 45 years old and has worked 20 years in public administration; and the "Endorsers" 699 shows multiple endorsers 687 have endorsed translator 118 as will be further described with reference to the embodiments below. Note that although not shown, translator 118 is capable of providing all of the above-referenced data after which the information becomes viewable as shown.

Figure 7:
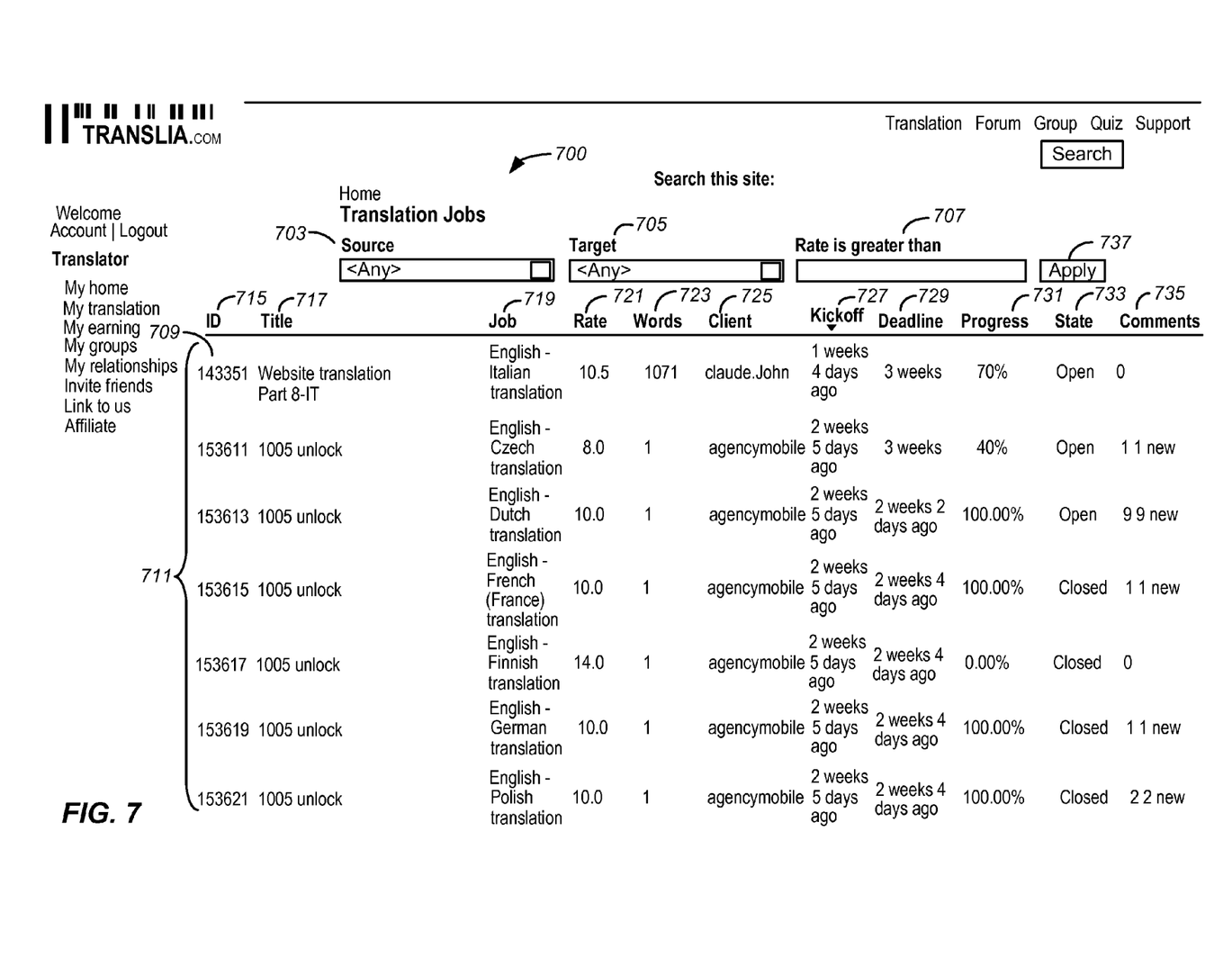
FIG. 7 shows a "Translation Jobs" screen shot showing a listing of translation jobs according to an exemplary embodiment of the present invention.

FIG. 7 shows "Translation Jobs" screen shot 700 showing a listing of translation jobs according to an exemplary embodiment of the present invention.

In FIG. 7, "Translation Jobs" screen shot 700 enables translator 118 to select one of a plurality of translation jobs to be performed. As shown, translator 118 can use "Source" 703 drop down menu to select the source document language and can utilize "Target" 705 drop down menu to select a target language. The amount that translator 118 will accept is entered into the "Rate is greater than" 707 text area. "Apply" button 737 can then be clicked to filter the translation job results to those desired by translator 118.

In FIG. 7, a plurality of jobs 711 are displayed, each job having an "ID" 715, "Title" 717, "Job" 719, "Rate" 721, "Words" 723, "Client" 725, "Kickoff" 727, "Deadline" 729, "Progress" 731, "Date" 733 and "Comments" 735. If a job is available for translation, its title is highlighted and can be selected by translator 118.

Here translator 118 has selected job 709 entitled "Website Translation Part 8—IT" that is an English—Italian translation at a rate of 10.5 credits per word. Job 709 comprises 1,071 words for a client indicated as Claude.John. The kickoff or job start date was one week ago with a three-week deadline. The progress on the job is noted as 70% and the job is still open.

Figure 8:
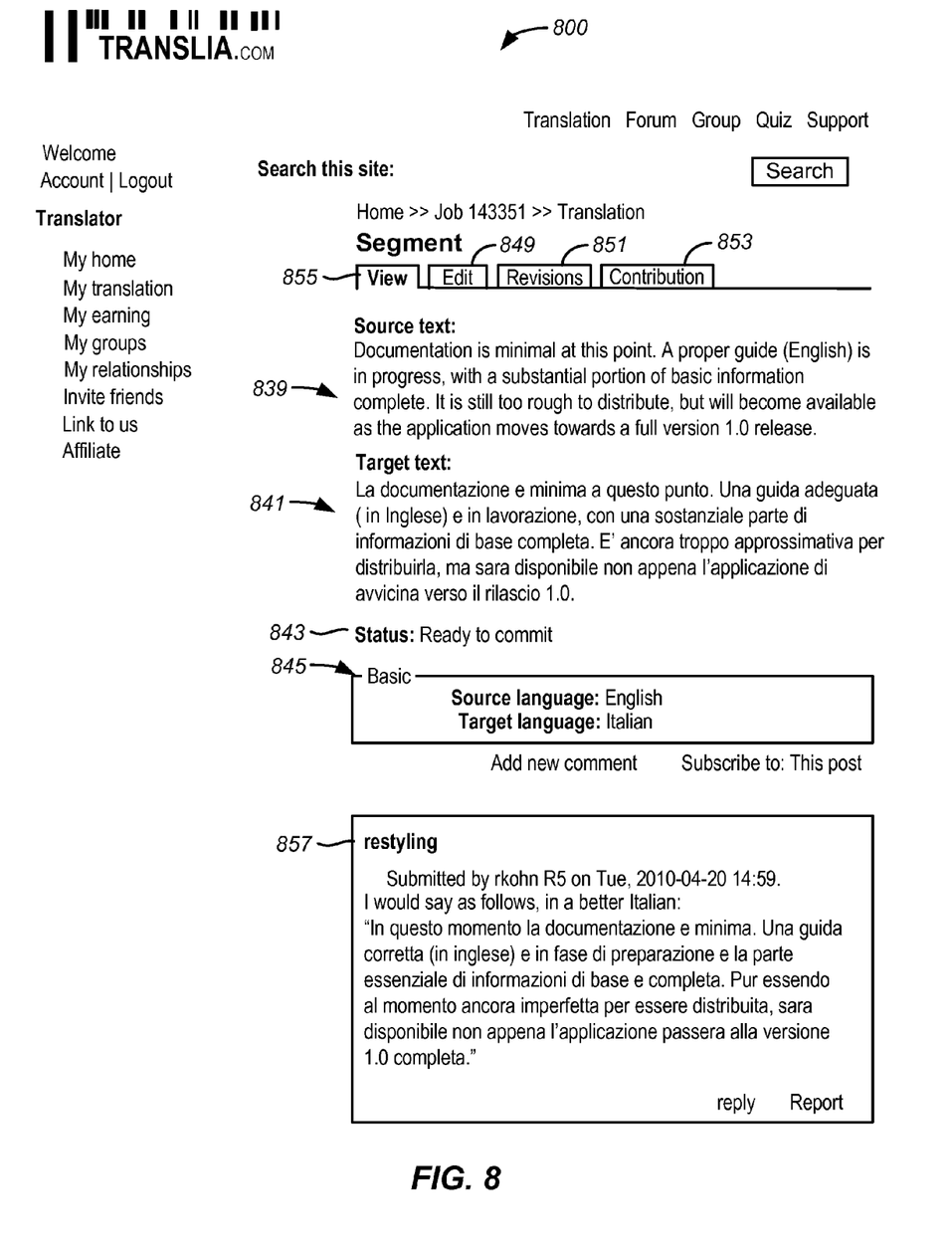
FIG. 8 shows a source-segment screen shot according to an exemplary embodiment of the present invention.

FIG. 8 shows source-segment screen shot 800 according to an exemplary embodiment of the present invention.

In FIG. 8, source-segment screen shot 800 enables translators to view, edit and revise a specific job as well as view contributions to that job. Specifically, in the present instance, the job displayed is "Segment 105179," which is part of the "Website Translation Part 8—-IT" job.

As previously noted, an advantage of the present invention is that host translation system 108 (FIG. 1) can parse each source file to extract translatable text from said source file for division into smaller segments. "Segment 105179" is such a segment. Each segment includes a source text and its corresponding translation (target) text. In this manner, multiple translators, i.e., translator 118, translator 120, translator 122 can work on different portions of the same job thus saving time and money particularly for large jobs.

In FIG. 8, source-segment screen shot 800 includes "View" tab 855, "Edit" tab 849 "Revisions" tab 851 and "Contribution" tab 853. By selecting "View" tab 855, "Source text" 839, "Target text" 841, "Status" 843 and basic information 845 are displayed. "Source text" 839, which is in English, has been translated and is shown as "Target text" 841 in Italian. Basic information 845 displays the source and destination languages and "restyling" 857, users or translators ranked lower than the original translator can provide comments about the translation job.

Thus, as shown, the translation of "Segment 105179" is complete. This completed stage is indicated by "Status" 843, which is shown as Ready-to-commit As previously noted, a segment status can be set to Needs Translation—the default when a particular segment is not yet translated; Needs Editing—the segment has been translated but needs improvement; Needs Proof reading—the segment has been edited but further improvement is required; and Ready-to-commit— segment is well edited and proofed and is ready for client use.

By setting a segment status, other translators can be aware of what is required to move a job to the next phase. The client can also be kept informed as to the progress of the job. The job progress is 100% when all segments are ready-to-commit Host translation system 108 automatically calculates the progress for each job based on segment status. When all of the segment statuses are set to ready-to-commit the job progress is 100%, and all of the separate segments are recombined into a single target language file for the client.

Figure 9:
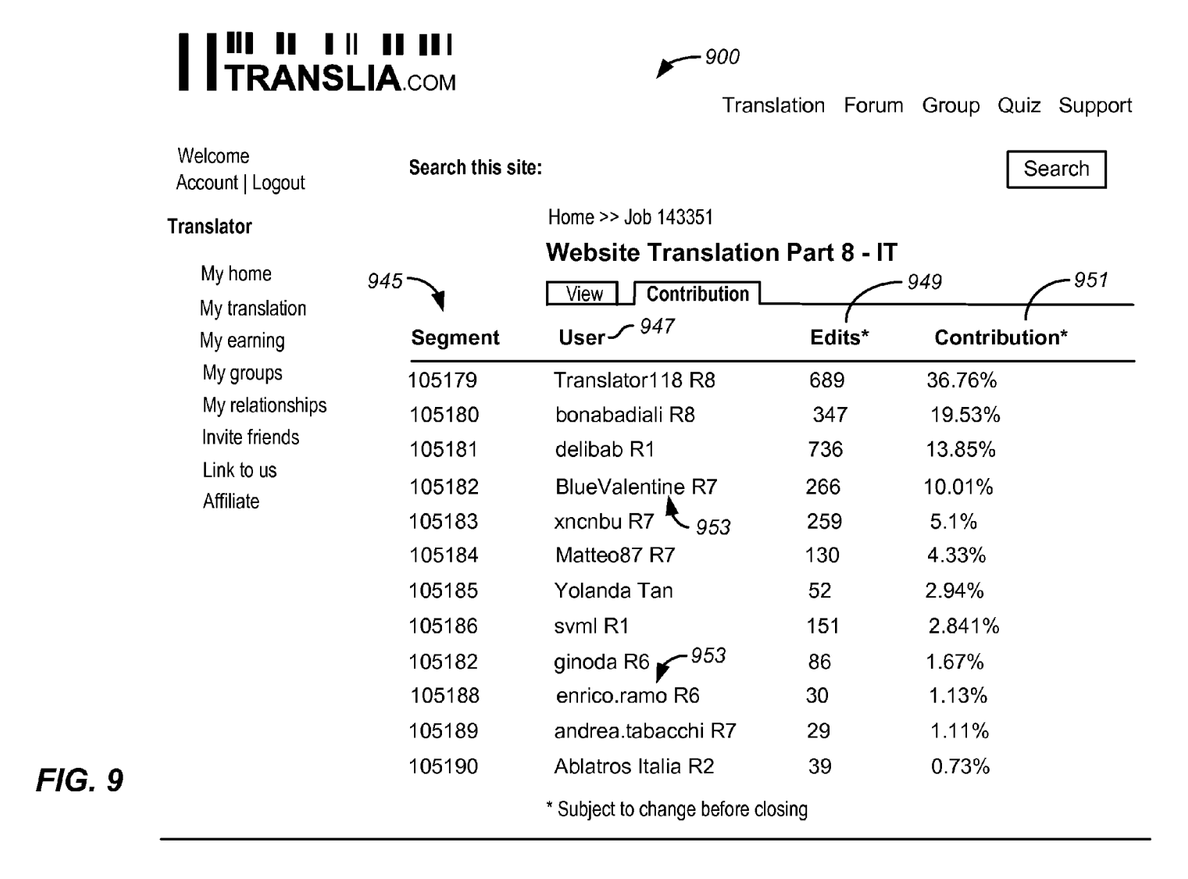
FIG. 9 is a screen shot illustrating total translator contributions for the job "Website Translation Part 8—IT" according to an exemplary embodiment of the present invention.

FIG. 9 is screen shot 900 illustrating total translator contributions for the job "Website Translation Part 8—IT" according to an exemplary embodiment of the present invention.

In FIG. 9, screen shot 900 shows that the job "Website Translation Part 8—IT" is segmented into a plurality of segments 945. Each "Segment" 945 is edited by each of "User" 947 (Translators) and also shows the total translator "Edits" 949 and "Contribution" 951. Note that each "User" 947 has an associated rank 953 R1-R10.

Specifically, segment 105179 has been translated by translator 118 with 689 edits and a contribution of 36.76%. All of the translator contributions add up to 100% for the entire job. The contribution to any particular segment or job is measured by the number of edits, that is, by each character that is either entered or revised.

In FIG. 9, the ranking of each translator might impact total contributions as well. Here, translator 118 has a ranking of 8, wherein the translator ranking ranges from 1 through 10, 10 being the highest. This range shows that translator 118 is ranked higher than many translators and might perform more revisions relative to other translators. The translator rank is dynamic and is an indicator of performance and the activity of a particular translator.

Rankings are improved when translators deliver satisfactory services to clients for positive ratings; rankings might also be improved when translators endorse their colleagues for performing translation jobs; further yet, translators can earn kudos by staying active within the translation system. Translators with higher rankings can earn more when working on the same job. Further, in order to edit, move or change the status of a job from one state to the next sequential state, a translator must have a higher ranking than the translator that performed the work. In this manner, the present invention provides a ranking system that improves translation performance and quality and further encourages collaboration between all translators.

Figure 10:
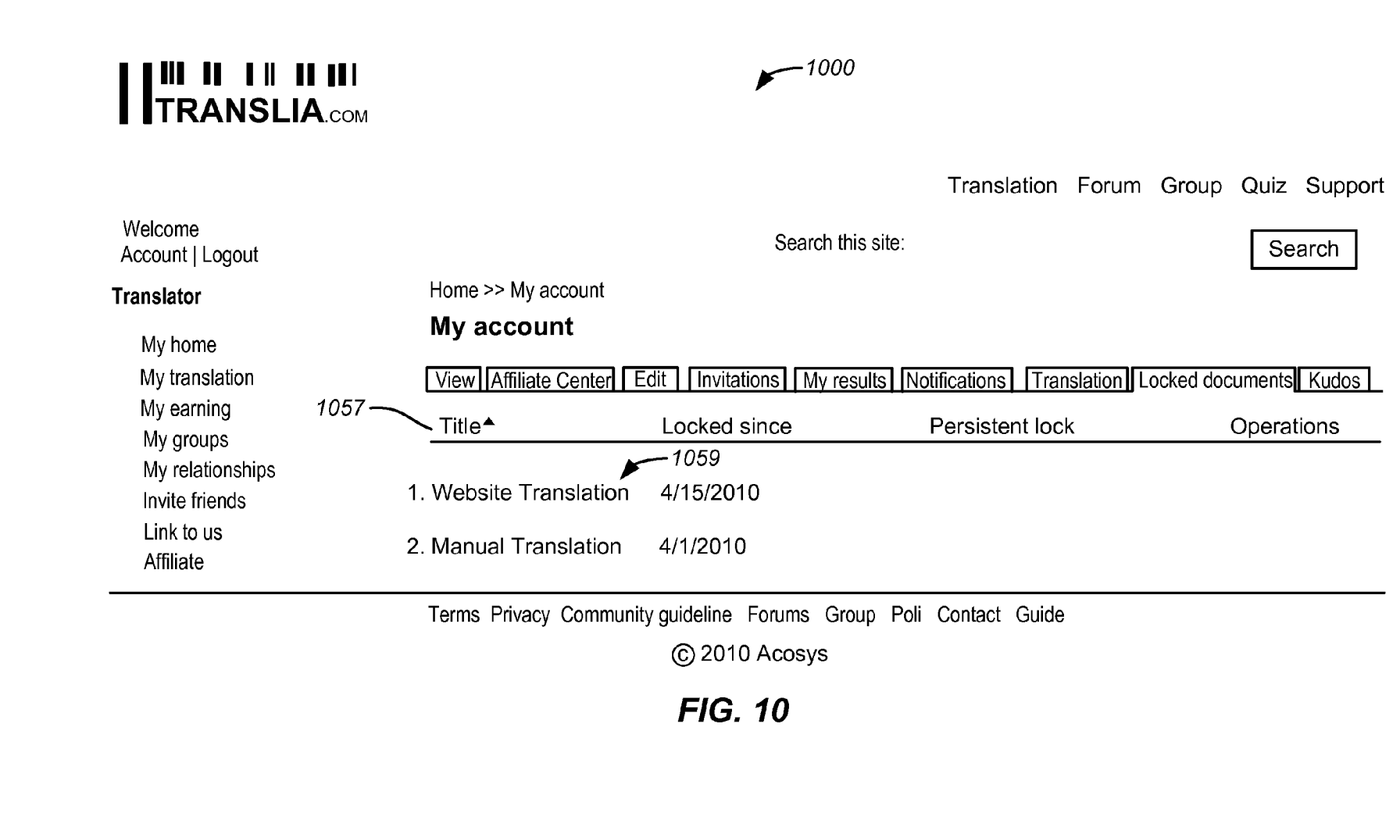
FIG. 10 illustrates a translator-account screen shot according to an exemplary embodiment of the present invention.

FIG. 10 illustrates translator-account screen shot 1000 according to an exemplary embodiment of the present invention.

In FIG. 10, translator-account screen shot 1000 enables translators to access and view various information related to their translator accounts. Here, information related to locked documents in a translator account is displayed. As shown, document "Website Translation" has been locked since Apr. 15, 2010. Document "Manual Translation" has also been locked since Apr. 1, 2010. As previously mentioned, the present invention enables source segment documents to be locked so that multiple translators are prevented from simultaneously editing the same source segment text.

Figure 11:
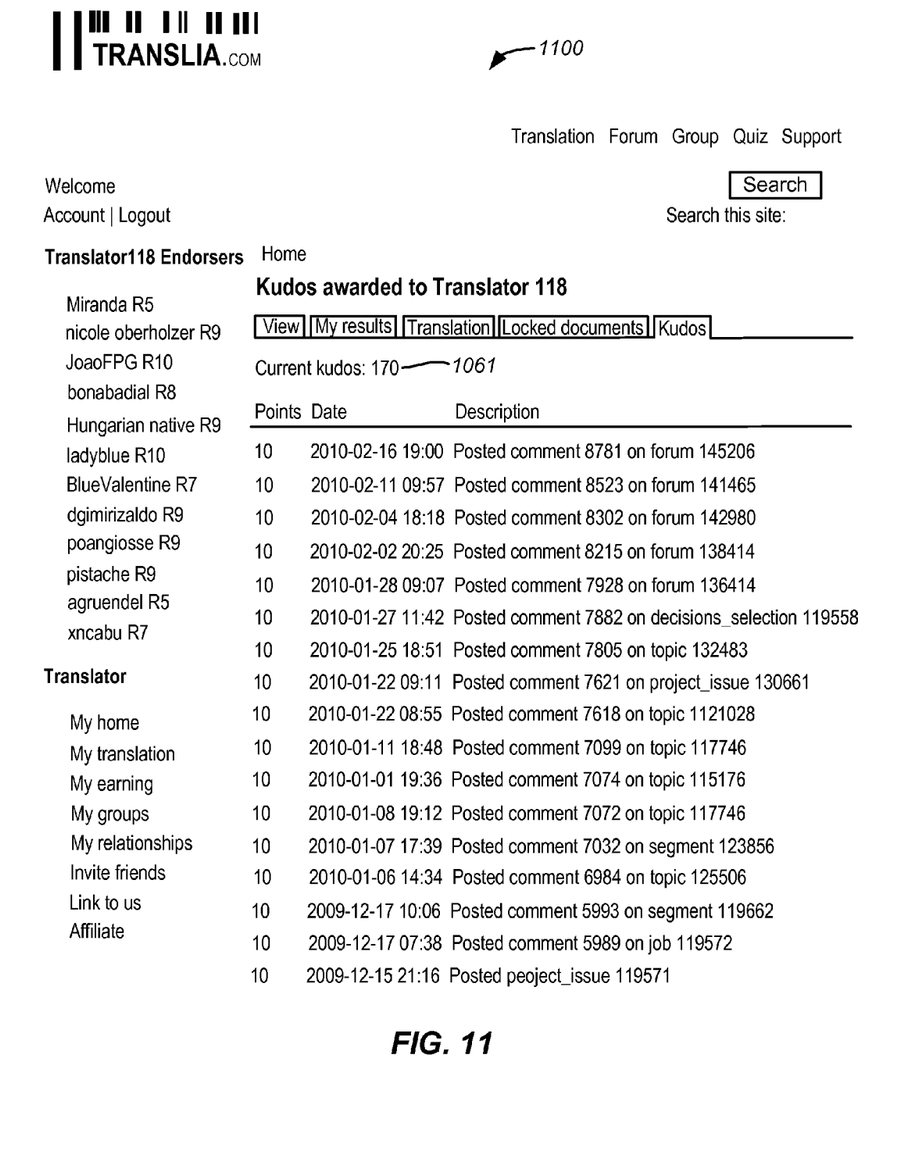
FIG. 11 shows an awarded-kudos screen shot according to an exemplary embodiment of the present invention.

FIG. 11 shows awarded-kudos screen shot 1100 according to an exemplary embodiment of the present invention.

In FIG. 11, kudos awarded to translator 118 are shown. Kudos are points earned by translators for remaining active within the translation system. For example, on Feb. 16, 2010, translator 118 received 10 points for posting comment 8781 on forum 145206. In fact, translator 118 has remained relatively active and has thus accrued a total of 170 points as shown by "Current Kudos" 1061.

Figure 12:
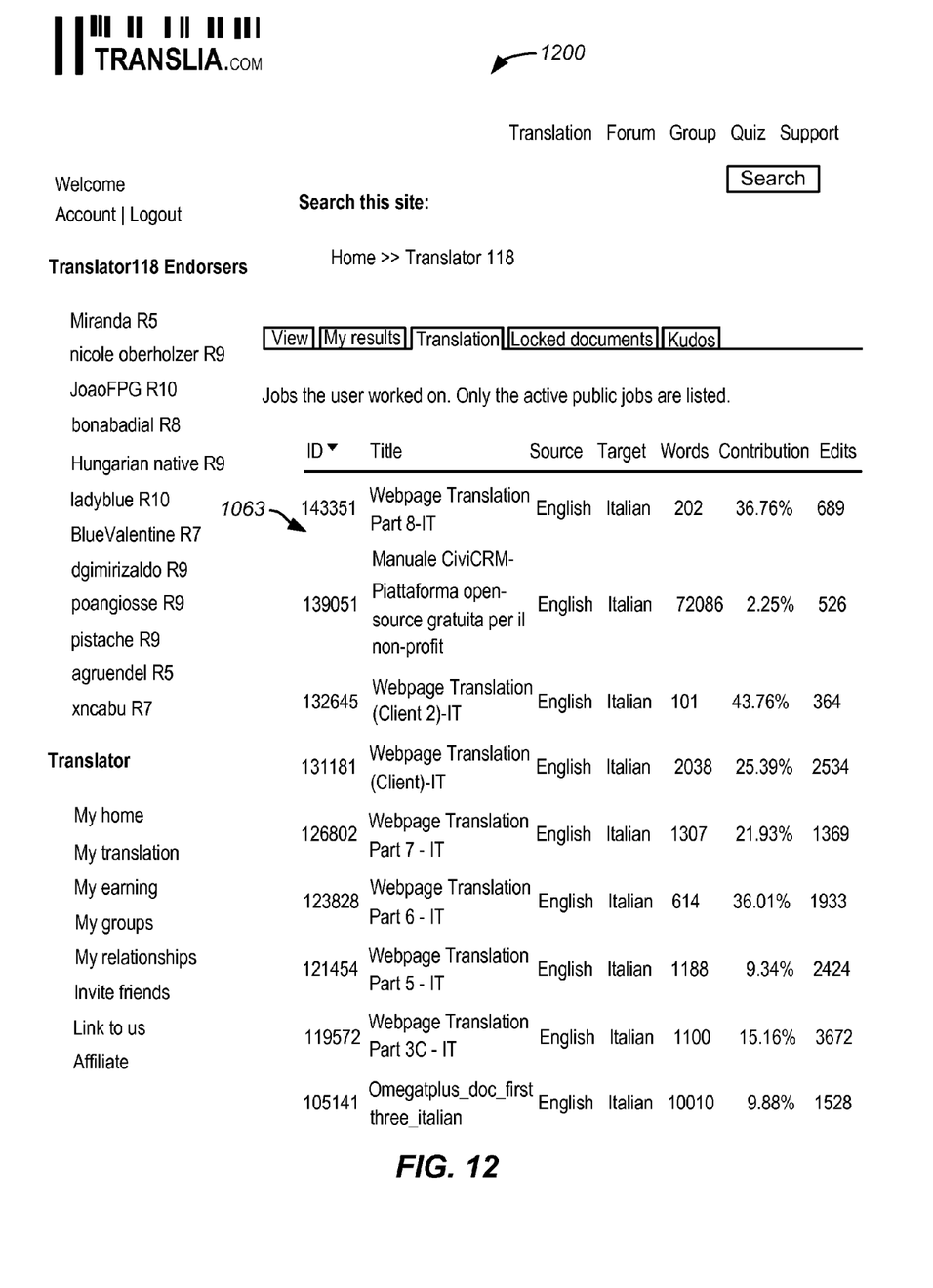
FIG. 12 illustrates a translator-account screen shot according to an exemplary embodiment of the present invention.

FIG. 12 illustrates translator-account screen shot 1200 according to an exemplary embodiment of the present invention.

In FIG. 12, translator-account screen shot 1200 enables translators to access and view various information related to their translator accounts. Here, information related to all of the translation jobs 1063 performed by translator 118 is displayed. As an example, translator 118 performed a job with ID 143351 entitled "Web Translation Part 8—IT." As another example, translator 118 also performed a job having ID 139051 entitled "Manuale CiviCRM-Piattaforma open-source gratuita per it non-profit," translated from source language English to target language Italian.

While the above is a complete description of exemplary-specific embodiments of the invention, additional embodiments are also possible. Thus, the above description should not be taken as limiting the scope of the invention, which is defined by the appended claims along with their full scope of equivalents.

The invention claimed is:

1. A method for translating a source data from a source language to a target language, said source data being uploaded by a user to a translation system, said method comprising:
   receiving said source data for translation after said user is properly authenticated;
   fragmenting said source data into a plurality of source segments, wherein said plurality of source segments are independently translatable from source language to target language as separate units;
   providing revision control by locking each source segment so that each source segment is not subject to multiple translations at any given time;
   determining a contribution amount indicating an amount of translation performed,
   wherein said contribution amount is based on a total number of character changes in a source segment; and
   upon completion of translation, recombining each of said plurality of source segments into a single target data.

2. The method of claim 1 wherein said contribution amount is based upon a status state of a source segment.

3. The method of claim 2 further comprising determining a translation fee based on said contribution amount.

4. A translation system for translating a source data from a source language to a target language, said translation system comprising a computer processor and associated memory capable of processing one or more lines of computer code, wherein said source data is uploaded by a user to said translation system for translation, said translation system further comprising:
   one or more lines of code for receiving said source data for translation after said user is properly authenticated;
   one or more lines of code for fragmenting said source data into a plurality of source segments, wherein said plurality of source segments are independently translatable from source language to target language as separate units;
   one or more lines of code for providing revision control by locking each source segment so that each source segment is not subject to multiple translations at any given time;
   wherein said one or more lines of code for providing revision control further comprises one or more lines of code for assigning one of a plurality of status states to each source segment;
   one or more lines of code for determining a contribution amount indicating an amount of translation performed,
   wherein said contribution amount is based on a total number of character changes in a source segment; and
   upon completion of translation, one or more lines of code for recombining each of said plurality of source segments into a single target data.

5. The translation system of claim 4 wherein said contribution amount depends upon a status state of said source segment.

6. The translation system of claim 5 further comprising one or more lines of code for determining a translation fee based on said contribution amount.

* * * * *